(12) United States Patent
Amundson et al.

(10) Patent No.: US 11,713,891 B2
(45) Date of Patent: Aug. 1, 2023

(54) CARBON MONOXIDE DETECTION SYSTEM

(71) Applicant: Ademco Inc., Golden Valley, MN (US)

(72) Inventors: John B. Amundson, Minneapolis, MN (US); Kenneth Eskildsen, Great Neck, NY (US)

(73) Assignee: Ademco Inc., Golden Valley, MN (US)

( * ) Notice: Subject to any disclaimer, the term of this patent is extended or adjusted under 35 U.S.C. 154(b) by 540 days.

(21) Appl. No.: 16/599,030

(22) Filed: Oct. 10, 2019

(65) Prior Publication Data

US 2021/0108818 A1   Apr. 15, 2021

(51) Int. Cl.
| | | |
|---|---|---|
| G05B 21/00 | (2006.01) | |
| F24F 11/32 | (2018.01) | |
| G05B 15/02 | (2006.01) | |
| G08B 21/14 | (2006.01) | |
| G08B 21/18 | (2006.01) | |
| H04W 4/12 | (2009.01) | |

(52) U.S. Cl.
CPC .............. F24F 11/32 (2018.01); G05B 15/02 (2013.01); G08B 21/14 (2013.01); G08B 21/182 (2013.01); H04W 4/12 (2013.01)

(58) Field of Classification Search
CPC ....................................................... F24F 11/32
USPC ......................................................... 700/275
See application file for complete search history.

(56) References Cited

U.S. PATENT DOCUMENTS

| | | | |
|---|---|---|---|
| 5,793,296 A | 8/1998 | Lewkowicz | |
| 6,484,951 B1 | 11/2002 | Mueller | |
| 7,579,956 B2 * | 8/2009 | Chapman, Jr. | F24F 11/0001 340/632 |
| 8,836,522 B2 * | 9/2014 | Thorpe | F23N 5/242 340/628 |
| 9,513,007 B2 * | 12/2016 | Kuchta | F23N 5/242 |
| 9,600,989 B2 * | 3/2017 | Fadell | G08B 21/22 |
| 9,959,717 B2 * | 5/2018 | Thornton | G08B 7/066 |
| 10,426,358 B2 * | 10/2019 | Barnett, Jr. | A61B 5/6816 |
| 10,684,029 B2 * | 6/2020 | Alexander | F24F 11/52 |
| 2009/0134993 A1 | 5/2009 | Ashworth | |
| 2010/0330515 A1 * | 12/2010 | Ueki | F23N 5/242 340/632 |
| 2012/0251963 A1 | 10/2012 | Barker | |
| 2014/0172297 A1 * | 6/2014 | Lin | G01S 5/0252 701/533 |

(Continued)

FOREIGN PATENT DOCUMENTS

| | | | | |
|---|---|---|---|---|
| AU | 2013101580 A4 | 1/2014 | | |
| CN | 101681951 A * | 3/2010 | | F24D 5/10 |

(Continued)

OTHER PUBLICATIONS

Extended Search Report from counterpart European Application No. 20181259.1, dated Dec. 10, 2020, 8 pp.

(Continued)

*Primary Examiner* — Evral E Bodden
(74) *Attorney, Agent, or Firm* — Greenberg Traurig, LLP; Ryan D. Sharp; David J. Dykeman

(57) ABSTRACT

In some examples, a method includes receiving, from a carbon-monoxide (CO) sensor, an indication of an above-threshold level of CO for an above-threshold amount of time; determining, from a plurality of appliances, a subset of appliances associated with the CO sensor; and deactivating the subset of appliances.

18 Claims, 6 Drawing Sheets

(56) References Cited

U.S. PATENT DOCUMENTS

2017/0045899 A1* 2/2017 Zywicki ................. F24F 11/65

FOREIGN PATENT DOCUMENTS

| CN | 104329773 A | | 2/2015 | |
|---|---|---|---|---|
| CN | 205957400 U | * | 2/2017 | |
| GB | 2539830 A | * | 12/2016 | ............ F23N 5/245 |
| GB | 2539830 A | | 12/2016 | |

OTHER PUBLICATIONS

Response to Rule 70(2) and 70a(2) EPC dated Apr. 19, 2021, from counterpart European Application No. 20181259.1, filed Oct. 11, 2021, 50 pp.

Vivint, "Carbon Monoxide Detector," accessed from https://www.vivint.com/products/carbon-monoxide-detector on or about May 14, 2019, 6 pp.

Nest, "Learn how Nest products work together," Nest Support, accessed from https://nest.com/support/article/Learn-how-Nest-products-work-together#smokeorco on or about, May 14, 2019, 8 pp.

* cited by examiner

CARBON MONOXIDE DETECTION SYSTEM

TECHNICAL FIELD

This disclosure relates to home monitoring, comfort, and security systems.

BACKGROUND

Carbon monoxide (CO) is a colorless, odorless gas produced as a by-product from many fuel-burning energy sources. According to the Consumer Product Safety Commission, approximately 200 people in the United States die each year from carbon monoxide poisoning associated with home fuel-burning heating equipment. Consumers may install a carbon-monoxide detector configured to emit a loud, high-pitched alert in response to detecting the presence of CO within the home.

SUMMARY

In general, this disclosure relates to systems, devices, and techniques for managing above-threshold levels of carbon monoxide detected within a home or other building. A networked system of smart home appliances may be configured to activate or deactivate as appropriate in response to one or more CO sensors detecting an above-threshold level of CO for an above-threshold amount of time. After determining a subset of potential sources of CO emissions, based, for example, on their proximity to the particular alerting CO sensor, the system may be configured to deactivate one or more of the possible CO sources and/or activate a ventilation system to diffuse the gas.

In some examples, a method includes maintaining, in a memory, a set of associations between two or more carbon monoxide (CO) sensors and two or more CO sources; determining, by processing circuitry and based on data received from a first CO sensor of the two or more CO sensors, that a first level of CO detected by the first CO sensor has exceeded a first threshold level of CO for a first threshold period of time; identifying, based on the set of associations, a first subset of CO sources associated with the first CO sensor, wherein the first subset of CO sources comprises fewer than all of the two or more CO sources; and transmitting a signal that causes the first subset of CO sources to be disabled.

In some examples, a CO detection system includes two or more carbon monoxide (CO) sensors and a controller device comprising a memory configured to store a set of associations between the two or more CO sensors and two or more CO sources; and processing circuitry configured to receive an indication that a first CO sensor of the two or more CO sensors has detected a level of CO that is above a threshold level for a threshold amount of time; retrieve from memory the set of associations; determine, based on the set of associations, a first subset of CO sources associated with the first CO sensor, wherein the first subset of CO sources comprises fewer than all of the two or more CO sources; and transmit a signal that causes the first subset of CO sources to be disabled.

The details of one or more examples of the disclosure are set forth in the accompanying drawings and the description below. Other features, objects, and advantages will be apparent from the description, drawings, and claims.

DETAILED DESCRIPTION

Figure 1:
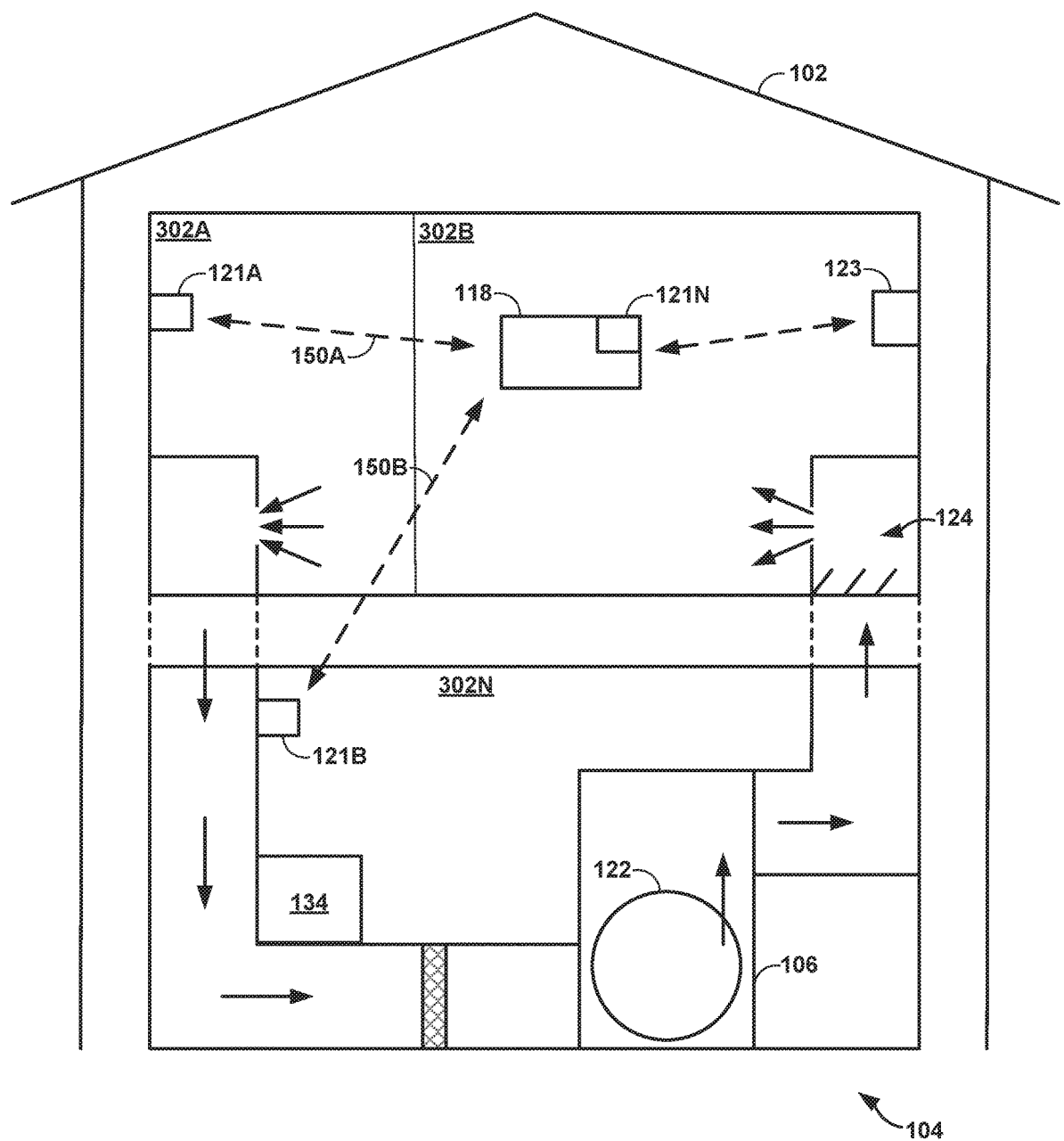
FIG. 1 is a diagram of a carbon monoxide (CO) detection system in a building, in accordance with some examples of this disclosure.

Various examples are described below for managing carbon monoxide (CO) levels detected by one or more networked CO sensors within a building. The plurality of sensors may be configured to detect CO levels in a plurality of spaces (e.g., rooms) within the building. FIG. 1 is a block diagram of a CO detection system 104 installed in a building 102, in accordance with some examples of this disclosure. Building 102 may include any commercial, industrial, or residential building, and may be connected to one or more utilities such as water, natural gas, electricity, internet, etc. Building 102 may also include a plurality of (e.g., two or more) appliances 134 housed in one or more spaces or rooms 302A-302N throughout the building. One or more of appliances 134 may use the combustion of a fuel source, such as wood, coal, gasoline, propane, or natural gas, as an energy source to power or heat the appliance. Some non-limiting examples of gas-combustion-based appliances, machines, and systems include stoves and kitchen ranges; fireplaces; furnaces; washers and dryers; water heaters; vehicles; and heating, ventilation, and air-conditioning (HVAC) systems. Typically the CO produced by these appliances is vented to outside building 102, but if such venting is not present or not working properly, then the combustion of the aforementioned fuel sources may produce high levels of CO within building 102 as a by-product. Exposure to elevated levels of CO can be harmful to the health of humans, and sufficient exposure may result in death.

Cautious consumers, managers, residents, tenants, or other occupants of building 102 may purchase and install a plurality of (e.g., two or more) CO sensors 121A-121N (collectively, "CO sensors 121"), configured to detect elevated levels of CO within building 102. Typical CO sensors are configured to instantly output a loud and/or high-pitched alert in response to the sensor's internal detection mechanism indicating the presence of CO. CO sensors may be battery-powered or configured to plug into a wall outlet.

In some examples in accordance with this disclosure, a "smart" CO-detection system 104 may include a plurality of networked CO sensors 121 communicatively connected to a controller device 118. Controller device 118 may be any computing device configured to perform a particular action in response to any of CO sensors 121 indicating (e.g., detecting) the presence of an amount of CO that has been above a threshold level of CO for a corresponding threshold length of time (e.g., duration). For example, CO detection system 104 may include processing circuitry and a memory (e.g., within any or all of CO sensors 121 and/or controller device 118) configured with data indicative of a plurality of different threshold CO levels (in some examples, a continuous spectrum of threshold CO levels), each threshold CO level having a corresponding time duration for which an individual CO sensor 121 must detect the respective threshold CO level in order to trigger a corresponding response from system 104. As described further with respect to FIG. 6 below, the threshold CO levels and their corresponding threshold detection durations may be inversely proportional to one another. That is, a CO sensor may detect a relatively high threshold level of CO for a relatively short amount of time before system 104 triggers a response. Conversely, a CO sensor may detect a relatively low threshold level of CO for a relatively long duration before system 104 triggers a response. This inverse relationship between threshold CO levels and threshold detection durations may help to reduce the occurrence of false-positive "nuisance" alerts that can often occur with typical, non-"smart" CO-detection systems.

Controller device 118 may include any local computing device within a building, such as an internet router, smart speaker, smart television, personal computer, or a mobile computing device, such as a smartphone, laptop, or tablet. In some examples, controller device 118 may include a smart thermostat, configured to control (e.g., activate, deactivate, and modulate) a heating and/or cooling system within building 102. For example, controller device 118 may be configured to deactivate one or more combustion-based heat sources or appliances in response to any of CO sensors 121 indicating that both of the respective thresholds (e.g., both CO level and time duration) have been met.

In some examples, controller device 118 may include an integrated security hub configured to manage one or more systems within building 102. In some examples, system 104 includes both a security hub and a separate (e.g., in data communication with, but physically distinct from a) thermostat device. In these examples, CO sensors 121 may indicate CO levels and durations to the security hub, which in turn indicates the CO levels and durations to the separate thermostat device, if needed.

In some examples in accordance with this disclosure, CO detection system 104 is configured to intelligently select (e.g., determine or identify) a particular subset of potential CO sources to deactivate, based at least in part on which particular CO sensor 121 of the plurality indicates above-threshold CO levels for above-threshold durations. As one example, CO detection system 104 may be configured to deactivate all CO sources and combustion-based appliances 134 that are housed within the same room 302 as the indicating CO sensor 121, while leaving all other potential CO sources within building 102 unaffected. For example, if a particular CO sensor 121, which is housed within a kitchen, detects threshold levels and durations of CO, system 104 may deactivate a stove and/or other kitchen appliances while leaving a basement-based hot-water heater 106 unaffected, especially if a basement-based CO sensor does not indicate the presence of CO.

For example, controller device 118 may be in data communication with a smart shut-off valve (e.g., a device placed over a valve, configured to close the valve in response to a digital command). The shut-off valve may be placed along a natural gas line, such as a main gas line to a building, a gas line to a room or region of a building, or even a gas line to an individual appliance. In response to receiving an indication of detected threshold CO levels and durations, controller device 118 may transmit a signal, causing the smart valve to close the respective gas line.

In other examples, controller device 118 may be in data communication with a smart appliance, such as a smart stove or dryer. Controller device 118 may transmit a signal commanding the smart appliance to deactivate (e.g., shut off) entirely.

In some examples, after deactivating a subset of CO sources, system 104 (e.g., controller device 118 within system 104) may receive a transmission from the respective CO sensor indicating a subsequently reduced CO level, indicating that at least one of the deactivated CO sources was a cause of the previously elevated CO level. System 104 may also be configured to selectively re-activate the deactivated sources one-by-one (e.g., one-at-a-time), and then monitor for additional transmissions from the respective CO sensor indicating a subsequent increased CO level, in order to identify at least one individual CO source from the subset of sources that is responsible for the CO leak. Upon identifying at least one CO leak source, system 104 may, if possible, re-activate all other CO sources except for the identified leak source, and may additionally output an indication, such as a mobile push notification or email, of the CO leak source so that it may be repaired or replaced.

Each of CO sensors 121 and controller device 118 may be connected, either wired or wirelessly, to the internet via internet gateway 123. Internet gateway 123 may be, for example, a Wi-Fi router or other such network device. As shown further with respect to FIG. 2 below, gateway 123 may be configured to transmit data to and from the cloud. For example, CO sensors 121 may indicate CO levels and durations to the cloud via gateway 123, and controller device 118 (e.g., a smart thermostat) may receive the levels from the cloud via gateway 123. In other examples, CO sensors 121 may indicate CO levels to controller device 118 (e.g., a security hub) which communicates the CO levels to the cloud, and a separate smart thermostat device may receive the CO levels from the cloud. In other examples, controller device 118 and internet gateway 123 may be the same device. Each of sensors 121A, 121B may communicate, either wired or wirelessly via data link 150A, 150B, respectively. For example, data link may include any wireless communication protocol such as Wi-Fi, Bluetooth, etc.

Additionally or alternatively to deactivating a particular subset of combustion-based energy source(s) and/or appliance(s), CO detection system 104 may be configured to activate a ventilation system 124 in order to dissipate elevated levels of CO. For example, if building 102 includes a forced-air furnace, system 104 may activate the furnace fan or blower 122 in order to dissipate above-threshold levels of CO. System 104 may additionally or alternatively turn on a ceiling fan, activate a range hood fan, open a garage door, open automatic windows, open a flue, or any other means of dissipating concentrated levels of CO within a building.

In examples in which CO detection system 104 deactivates a combustion-based heat source, system 104 may also activate a backup heat source to compensate. For example, if a system 104 deactivates a furnace, system 104 may also activate an in-floor heating system.

In some examples, CO detection system 104 may be configured to transmit a signal to deactivate one or more vehicles, such as a vehicle housed locally within a garage of the building. For example, a vehicle may include automatic or remote start/stop functionality that may be connected to system 104, such that system 104 may determine if the vehicle is running, and if so, deactivate it in response to elevated CO levels within or near a garage. Additionally or alternatively, CO detection system 104 may be configured to open a garage door to dissipate the gas.

Additionally or alternatively to deactivating a particular appliance or subset of appliances, in some examples, system 104 may be configured to shut off a natural gas valve in response to receiving an indication of above-threshold CO levels and durations from one or more of CO sensors 121. For example, one or more appliances may not include any "smart" components allowing system 104 to deactivate the appliance entirely. In these examples, system 104 may include a control device disposed on the main gas-supply line to building 102 and/or disposed on the gas-supply lines to each individual gas-powered appliance. Upon determining detected above-threshold CO levels and durations, system 104 (e.g., controller device 118 of system 104) may be configured to output commands (e.g., transmit a signal) to one or more of the control devices to close the respective gas line, depriving the appliances of fuel, effectively causing the CO source to be disabled.

Figure 2:
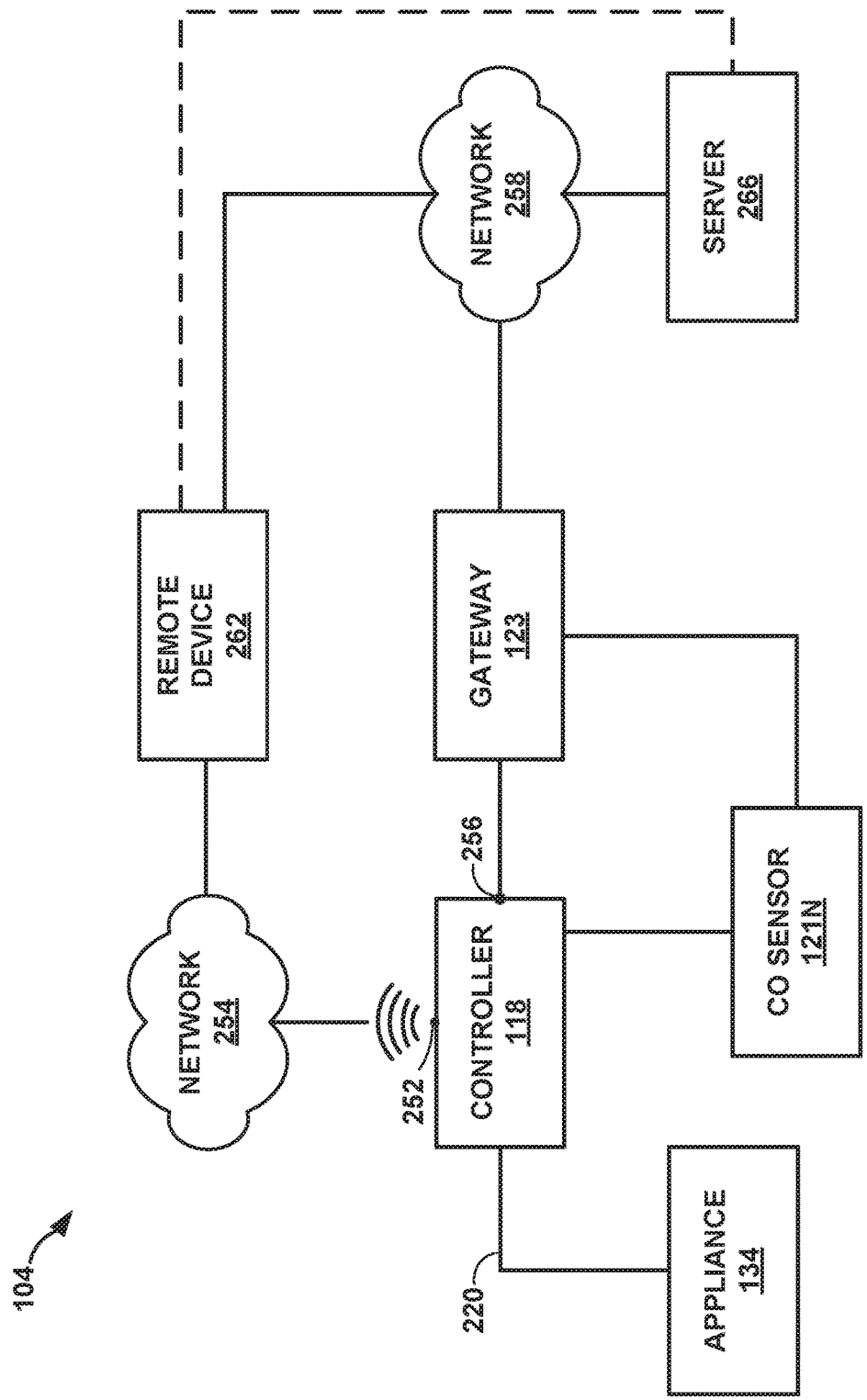
FIG. 2 is a conceptual block diagram of a CO detection system, in accordance with some examples of this disclosure.

FIG. 2 is a conceptual block diagram of the example CO detection system of FIG. 1. In particular, FIG. 2 shows an example of remote access and/or control of CO detection system 104, which may be part of a building automation system. CO detection system 104 includes controller device 118 configured to communicate with and control appliance 134 of CO detection system 104. Controller 118, such as a smart thermostat, security hub, or other computing device, may communicate with appliance 134 via wired or wireless communication link 220. Additionally, controller 118 may communicate over one or more wired or wireless networks that may accommodate remote access and/or control of controller 118 via another device such as a smart phone, tablet, e-reader, laptop computer, personal computer, key fob, or the like.

As shown in FIG. 2, controller 118 may include communications port 252 for communicating over network 254, and in some cases, communications port 256 for communicating over network 258. In some cases, network 254 may be a wireless local area network (LAN), and network 258 (when provided) may be a WAN or global network including, for example, the Internet. Gateway 123 connects communications port 256 to network 258, where gateway 123 can include a modem, an ethernet router, and/or a Wi-Fi router. In some cases, network 254 may provide a wireless access point and/or a network host device that is separate from controller 118. In other cases, network 254 may provide a wireless access point and/or a network host device that is part of controller 118. In some examples, network 254 includes a local domain name server (DNS). Network 254 may be an ad-hoc wireless network.

In some cases, controller 118 may be programmed to communicate over network 258 with an external web service hosted by one or more external web server(s) 266. An example of such an external web service is Honeywell's TOTAL CONNECT™ web service. Controller 118 may be configured to upload selected data via network 258 to the external web service where it may be collected and stored on server 266. In some cases, the data may be indicative of the performance of CO detection system 104. Additionally, controller 118 may be configured to receive and/or download selected data, settings and/or services sometimes including software updates from the external web service over network 258. The data, settings and/or services may be received automatically from the web service, downloaded periodically in accordance with a control algorithm, and/or downloaded in response to a user request. In some examples, such as when controller 118 includes a smart thermostat or security hub, controller 118 is configured to receive and/or download an HVAC operating schedule and operating parameter settings such as, for example, temperature set points, humidity set points, start times, end times, schedules, window frost protection settings, threshold CO detection levels and threshold CO detection times, and/or the like from server 266 over network 258. In some examples, controller 118 is configured to receive one or more user profiles having at least one operational parameter setting that is selected by and reflective of a user's preferences. In still other instances, controller 118 may be configured to receive and/or download firmware and/or hardware updates such as, for example, device drivers from server 266 over network 258.

Depending upon the application and/or where the CO detection system user is located, remote access and/or control of controller 118 may be provided over network 254 and/or network 258. A user can access and/or control controller 118 from a remote location (e.g. remote from controller 118) over network 254 and/or network 258 using remote device 262. Remote device 262 including, but not limited to, mobile phones including smart phones, tablet computers, laptop or personal computers, wireless network-enabled key fobs, e-readers, and/or the like. In many cases, remote device 262 is configured to communicate wirelessly over network 254 and/or network 258 with controller 118 via one or more wireless communication protocols including, but not limited to, cellular communication, ZigBee, REDLINK™, Bluetooth, Wi-Fi, IrDA, dedicated short range communication (DSRC), EnOcean, and/or any other suitable common or proprietary wireless protocol, as desired. In some cases, remote device 262 may communicate with network 254 via server 266 for security purposes, for example.

In some cases, an application program code stored in the memory of the remote device 262 may be used to remotely access and/or control controller 118. The application program code may be downloaded from an external web service, such as the web service hosted by the external web server 266 (e.g. Honeywell's TOTAL CONNECT™ web service) or another external web service. In some cases, the application may provide a remote user interface for interacting with controller 118 at remote device 262. For example, through the user interface provided by the application, a user may be able to change operating parameter settings such as, for example, temperature set points, humidity set points, start times, end times, schedules, window frost protection settings, accept software updates and/or the like. Communications may be routed from remote device 262 to server 266 and then, from server 266 to controller 118. In some cases, communications may flow in the opposite direction such as, for example, when a user interacts directly with controller 118 to change an operating parameter setting such as, for example, a schedule change or a set point change. The change made at controller 118 may be routed to server 266 and then from server 266 to remote device 262 where the application program executed by remote device 262 can present the information to a user.

In some cases, a user may be able to interact with controller 118 via a user interface provided by one or more web pages hosted by server 266. The user may interact with the one or more web pages using a variety of internet capable devices to change a setting or other parameter at controller 118, and in some cases view usage data and energy consumption data related to the usage of CO detection system 104. In some cases, communication may occur between remote device 262 and controller 118 without being relayed through server 266.

In some examples in accordance with this disclosure, a user or other installer of system 104 can designate a set of associations between two or more CO sensors 121 and a set of respective CO sources (e.g., appliances 134), using controller 118 or remote device 262, which is connected to controller 118 via network 254 and/or 258. For example, a user may purchase one or more of a controller 118, a CO sensor 121, or a smart appliance 134 or another potential CO source. The user may then add the devices to the network of system 104. For example, controller 118 or remote device 262 can run an application that presents a user interface (UI) to the user, where the UI prompts the user to select one or more appliances 134, as well as a particular CO sensor 121 that is, for example, nearest to, or housed within the same room as, the selected appliances. For example, controller 118 or remote device 262 can present text and/or audio prompting the user to select a CO sensor 121 from a list of sensors in CO detection system 104. Controller 118 or remote device 262 can provide a name and/or a location for each CO sensor 121 to the user. Additionally or alternatively, controller 118 or remote device 262 can present an image of a building showing the locations of the CO sensors 121 for the user to select one of the CO sensors 121 and one or more of the appliances 134 in order to establish the spatial association between the devices. In other examples, a smart appliance 134 may include a UI that allows a user to indicate or select a designated location within a building (e.g., a room) in which the appliance 134 is to be installed. Additionally or alternatively, smart appliance 134 may include a UI allowing a user to directly associate the appliance 134 with one or more CO sensors 121.

Figure 4:
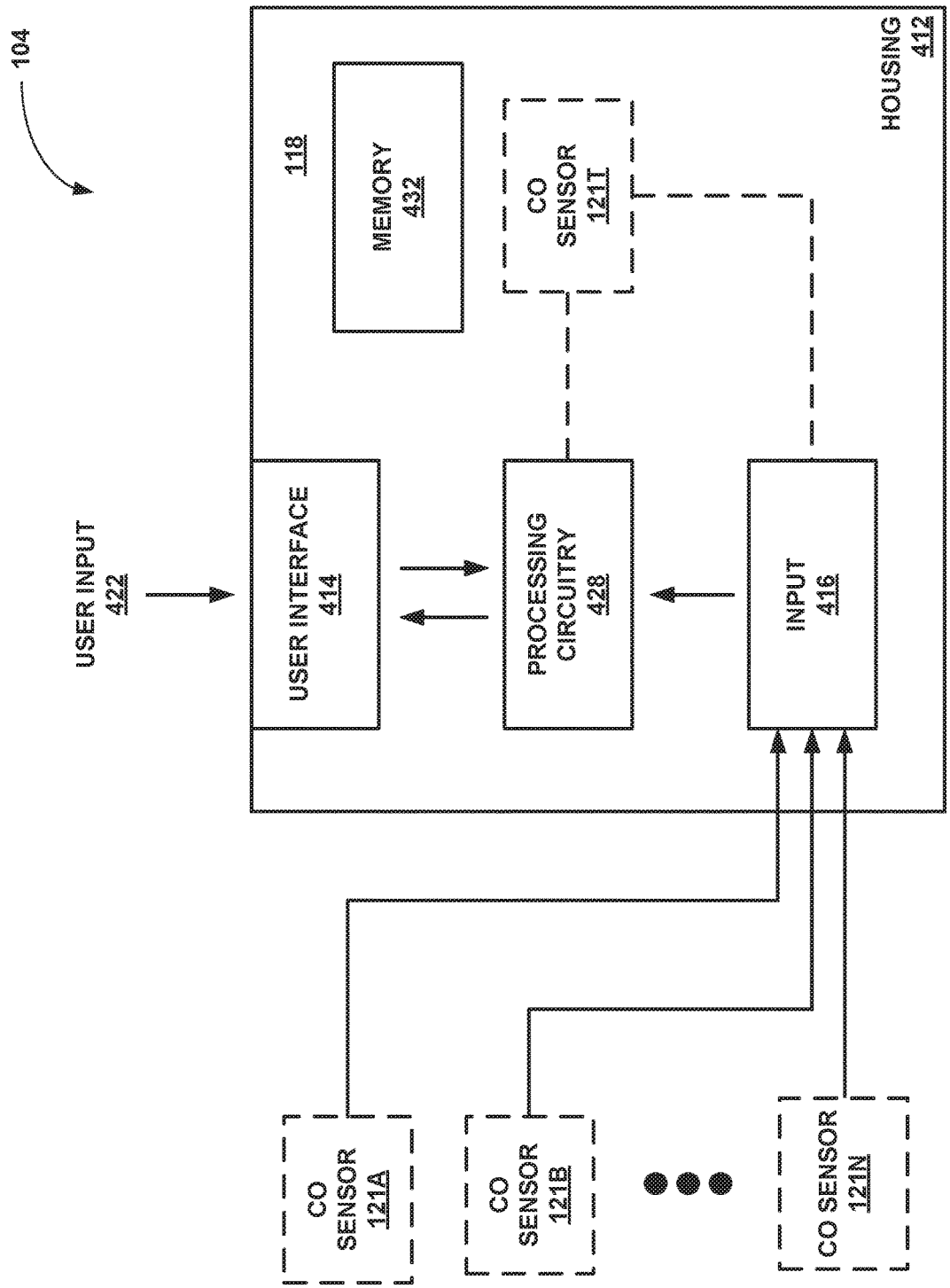
FIG. 4 is a conceptual block diagram of a controller for a CO detection system, in accordance with some examples of this disclosure.

By providing user input to controller 118 or remote device 262, a user can associate one or more appliances 134 or other CO sources, such as gas lines, with a particular CO sensor 121 from the plurality of sensors of CO detection system 104. The user can provide the user input by clicking a button, pressing a key, touching a touchscreen, clicking a mouse, or by entering text. The user can also provide audio user input through a voice command. In examples in which remote device 262 receives the user input, remote device 262 can transmit the selection made by the user to controller 118. Controller 118 can store the user-selected associations to memory 432 (FIG. 4).

In some examples, each of CO sensors 121 and appliances 134 may be configured to automatically detect each other based on proximity. For example, each of CO sensors 121 and appliances 134 may be include wireless communication capabilities and "scan" the nearby environment for similar proximal wireless signals. CO sensors 121 and appliances 134 may then designate and store spatial associations based, for example, on the relative "strength" of the wireless signals they find during the scan.

In some examples, system 104 may include a set of default commands and/or associations. For example, unless a user has explicitly designated a set of spatial associations between one or more CO sensors 121 and one or more potential CO sources, system 104 may be configured to deactivate a most-likely CO source in response to any of CO sensors 121 detecting above-threshold CO levels and durations. For example, system 104 may be configured to automatically shut a building's main gas valve by default. In another example, system 104 may be configured to automatically disable a water heater by default.

CO sensors 121 may indicate CO levels and durations to network 258 via gateway 123, and thermostat 118 may receive the levels from network 254 via gateway 123. In other examples, CO sensors 121 may indicate CO levels to security hub 118 which communicates the levels to network 254, and a separate smart thermostat device may receive the CO levels from network 258.

Figure 3:
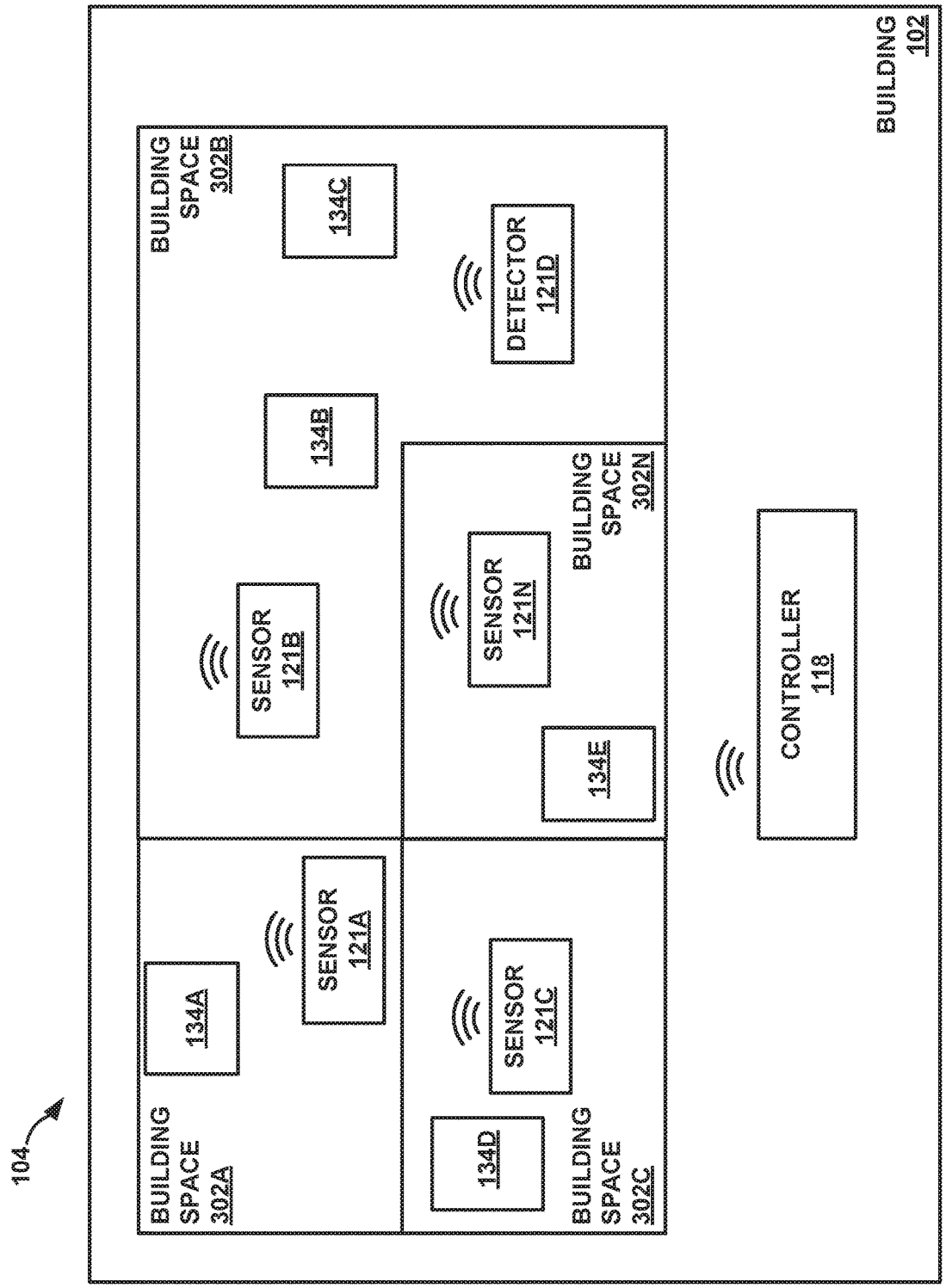
FIG. 3 is conceptual block diagram of a CO detection system with sensors in a plurality of spaces in a building, in accordance with some examples of this disclosure.

FIG. 3 is a conceptual block diagram of a CO detection system 104 with CO sensors in a plurality of spaces, such as rooms, within a building in accordance with some examples of this disclosure. Building 102 may be subdivided into a plurality of distinct spaces, floors, areas, wings, or rooms 302A, 302B, 302C, 302N, respectively. Each room 302 may include at least one CO sensor 121, respectively, or as shown in the example of room 302B, multiple CO sensors 121B, 121D.

In some examples in accordance with this disclosure, system 104 may be configured such that each CO sensor 121 is associated with a corresponding subset of appliances 134 or other sources of CO, which the respective CO sensor 121 is likely to detect before any of the other sensors 121. For example, CO sensor 121A may be associated (such as within a memory within system 104) with one or more combustion-based appliances 134A within the same room 302A as sensor 121A. Due to their relative proximity, CO sensor 121A is likely to detect high CO levels from one of those appliances 134A within the same room before any of the other sensors 121B-121N. When controller device 118 receives an indication of threshold CO levels and a threshold detection duration from CO sensor 121A, it may retrieve from memory an indication of the associated subset of appliances and output a command to deactivate that particular subset of appliances.

In some examples, system 104 may deactivate the entire subset of appliances 134 within a particular room 302, and then re-activate the devices one-at-a-time in order to determine a single appliance 134 from the subset of appliances that is the individual cause of the elevated levels of CO in the room 302. Upon determining a single (or multiple) appliance 134 as the cause of the elevated levels of CO, system 104 may re-activate all of the non-offending appliances and output a notification indicating the determined source(s) of CO, such as to a mobile device or other notification system.

In some examples of system 104, such as for professionally installed life safety systems, controller 118 may be configured to transmit an indication of detected CO to a central (e.g., remote) safety monitoring station or service. The central monitoring station, in return, may call the building or its managers, owners, and/or tenants to advise them of the issue and, if possible, the specific appliance or other CO source that is responsible. In some examples, the central monitoring station may also dispatch the local fire department to the premises.

FIG. 4 is a conceptual block diagram of a controller 118 for a CO detection system 104, in accordance with some examples of this disclosure. In some examples, controller 118 may be a wall-mountable thermostat. In other examples, controller 118 is a security hub panel or some other such device. Controller 118 may be configured to receive signals from a plurality of CO sensors 121A-121N, that are positioned in different spaces within a building, or in some examples, such as CO sensor 121T, integrated locally within controller 118. Controller 118 includes housing 412 and user interface 414 that is accessible from an exterior of housing 412. Controller 118 includes input 416 for receiving signals from CO sensors 121A-121N. In some examples, input 416 may be a wireless receiver or wireless transceiver. CO sensor 121T is located within housing 412 of controller 118, as indicated by sensor 121T shown in FIG. 4, and CO sensors 121A-121N are remote detectors that are located outside of controller 118, such as in different building spaces (e.g., rooms).

In some cases, input 416 receives detected CO levels and corresponding detected CO durations reported from each of the sensors 121, with each CO level corresponding to a particular building space, room, or level in which each detector is located. Each communication from one of sensors 121 to controller 118 may include an address of the sending sensor 121, so that controller 118 can determine which sensor sent the reported CO level and duration.

Controller 118 includes memory 432, configured by a user or other installer of system 104 to store a set of associations linking each CO sensor 121 to one or more potential sources of CO, such as appliances or gas lines, that have the potential to leak CO that the respective sensor 121 would subsequently detect. For example, memory 432 may be configured to store a lookup table or database associating a set of CO sensors 121 with a subset of respective CO sources. In other examples, memory 432 may be configured to store a lookup table or database associating a set of rooms 302 (FIG. 3) or other spatially-separated areas of a building, along with a one or more CO sensors 121 and/or CO sources housed within each respective room.

Processing circuitry 428 of controller 118 is operably coupled to user interface 414 and to input 416. In some cases, processing circuitry 428 is configured to control the CO detection system 104 by activating or deactivating one or more appliances or other sources of CO as necessary to reduce CO levels in a particular building space in which elevated CO levels have been detected. Controller 118 may repeatedly receive, via input 416, updated current CO levels and durations from each of the plurality of sensors 121, and controller 118 may be configured to deactivate one or more sources of CO and activate a ventilation system in order to diffuse the CO.

Figure 5:
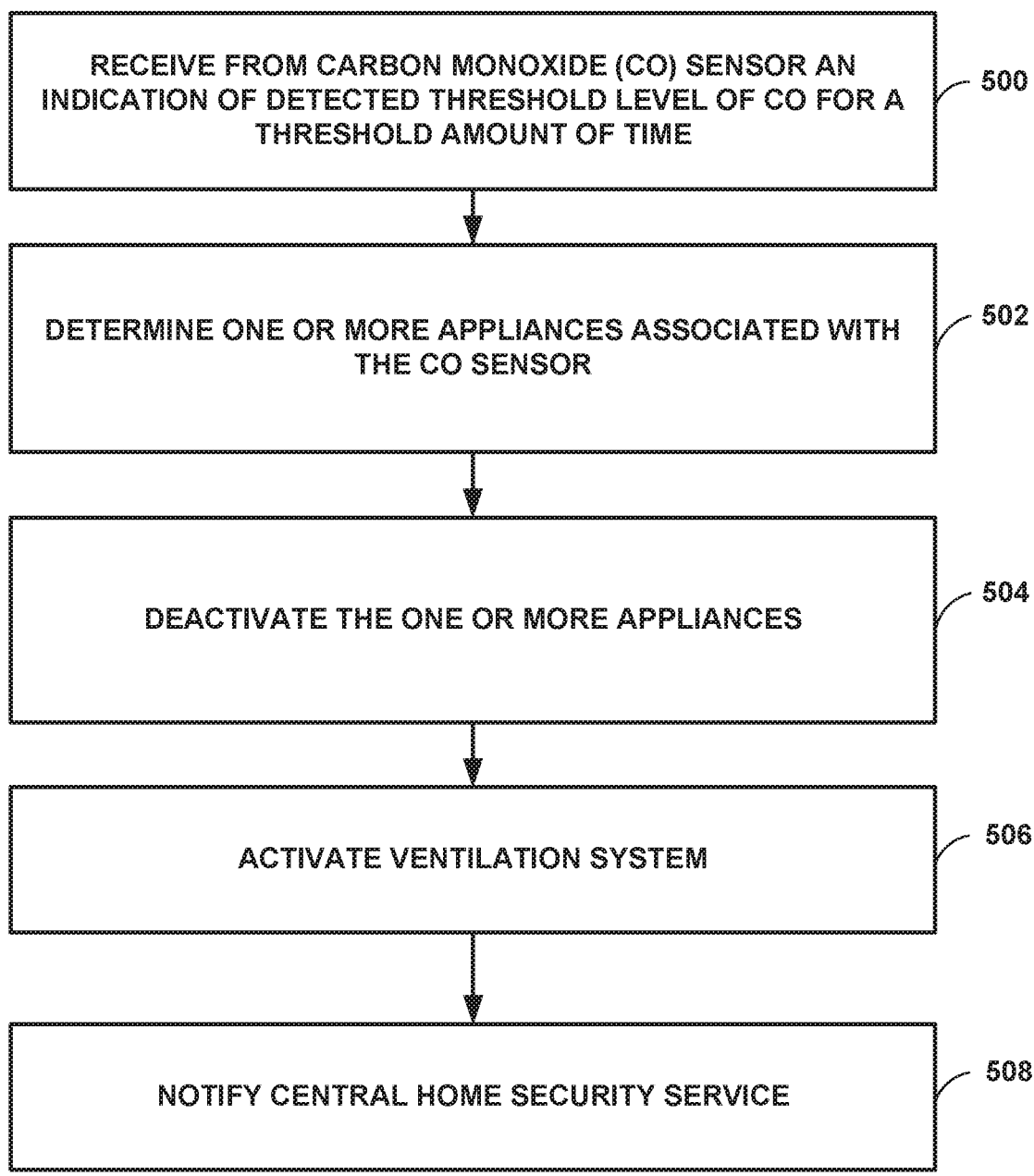
FIG. 5 is a flowchart illustrating an example process for controlling a CO detection system, in accordance with some examples of this disclosure.

FIG. 5 is a flowchart illustrating an example process for controlling a CO detection system, in accordance with some examples of this disclosure. Although the techniques of FIG. 5 are described with respect to the components of system 104 of FIG. 1, the techniques of FIG. 5 may be performed by any suitable system capable of performing the individual steps. Processing circuitry of a computing system, either internal to, or external to but in data communication with, a carbon monoxide (CO) sensor 121, receives an indication of a detected level of CO. The processing circuitry is configured to monitor the detected level and determine whether the detected level of CO exceeds a threshold level (e.g., amount or concentration) of CO for a corresponding threshold amount of time (500). Relatively higher threshold levels of CO may correspond to a shorter threshold amount of time, and vice versa. The processing circuitry determines (e.g., retrieves from internal or external memory), from the set of all potential CO sources within a building, a subset of potential CO sources associated with the particular CO sensor (502). The potential CO sources may include utility lines and/or appliances in close proximity to, or in the same room as, the particular CO sensor. The processing circuitry outputs a command to deactivate the particular subset of potential CO sources (504). For example, the processing circuitry may command a thermostat to deactivate a combustion-based heating system, or may command a control device to close a gas valve to either a particular appliance, a set of appliances, a room, or to the building as a whole.

In some examples, such as for particularly elevated levels of CO, the processing circuitry may further activate a ventilation system to more quickly dissipate the detected levels of CO (506). The processing circuitry may also generate and output a notification or other alert, such as a push notification to a mobile device or an email, to recommend that any occupants open one or more windows and/or evacuate the building. Additionally or alternatively, the processing circuitry may output a notification to a central security service (e.g., a central safety-monitoring station), so that they may notify the local fire department and/or individuals associated with the building (508).

Figure 6:
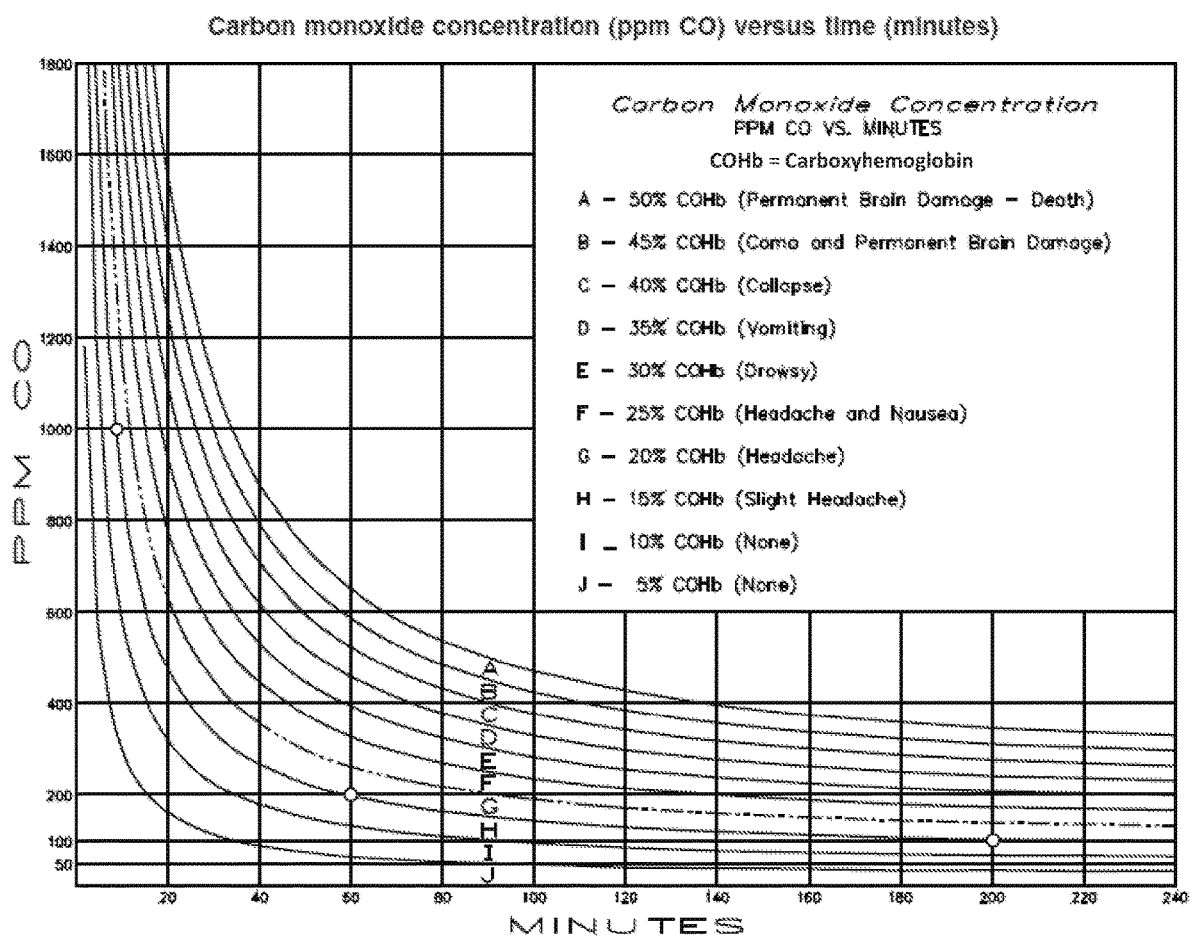
FIG. 6 is a graph illustrating an example relationship between a set of threshold CO-detection levels and corresponding threshold detection time durations, in accordance with some examples of this disclosure.

FIG. 6 is a graph illustrating a mathematical relationship between an example set of threshold CO detection levels and corresponding example threshold detection durations, in accordance with some examples of this disclosure. As described above, in order to reduce the occurrence of false-positive "nuisance" responses from CO detection system 104 (FIG. 1), system 104 may include a memory and processing circuitry configured to measure both an amount (level) of CO as well as monitor (measure) the time (duration) during which the corresponding level of CO is present. As shown in FIG. 6, a set of varying threshold CO levels may be inversely proportional to a corresponding set of threshold durations. For example, threshold CO levels and their respective threshold durations may be selected to remain below the "H" curve in order to prevent building residents from experiencing any adverse CO-related conditions. In some examples, threshold CO levels and durations may be selected to remain below the "I" or "J" curves for even greater safety measures.

For example, system 104 may detect a significantly high (e.g., deadly) threshold level of CO, such as 1000 parts per million (ppm), for a very brief amount of time, such as ten minutes or less (remaining under the "H" curve in FIG. 6), in order to trigger any or all of the responses discussed above, such as deactivating a gas line and/or appliances, activating a ventilation system, and/or outputting notifications and alerts. Conversely, system 104 may detect relatively low levels of CO, such as 200 ppm, for up to an hour without triggering a response (remaining under the "H" curve), due to the negligible risk to human health presented by the detected levels. In between high threshold CO levels and a low threshold CO levels may be either a discrete set or a sliding scale (e.g., a continuous spectrum) of respective increasing threshold detection durations.

In addition to the decreasing detection durations, the particular response by system 104 may similarly be variable with respect to the corresponding level of CO. For example, a low level of CO may only trigger a response such as a notification sent to a mobile device, whereas a high level of CO may trigger a much more comprehensive response of combustion source and device shutdowns in addition to the notification.

The following numbered examples demonstrate one or more aspects of the disclosure.

Example 1. A method includes maintaining, in a memory, a set of associations between two or more carbon monoxide (CO) sensors and two or more CO sources; determining, by processing circuitry and based on data received from a first CO sensor of the two or more CO sensors, that a first level of CO detected by the first CO sensor has exceeded a first threshold level of CO for a first threshold period of time; identifying, based on the set of associations, a first subset of CO sources associated with the first CO sensor, wherein the first subset of CO sources comprises fewer than all of the two or more CO sources; and transmitting a first signal that causes the first subset of CO sources to be disabled.

Example 2. The method of example 1, further including determining that a second level of CO detected by a second CO sensor of the two or more CO sensors is below the first threshold level of CO or has been above the first threshold level of CO for the less than the first threshold period of time, wherein the second CO sensor is different than the first CO sensor; and transmitting the first signal that causes the first subset of CO sources associated with the first CO sensor to be disabled without causing a second subset of CO sources associated with the second CO sensor to be disabled, wherein the second subset of CO sources comprises fewer than all of the two or more CO sources.

Example 3. The method of examples 1 or 2, wherein the subset of CO sources associated with the CO sensor are located in a same room as the CO detector.

Example 4. The method of any of examples 1-3, wherein the first subset of CO sources includes one or more appliances.

Example 5. The method of any of examples 1-4, further including determining that the first subset of CO sources associated with the first CO sensor includes a primary heat source; and activating a backup heat source.

Example 6. The method of any of examples 1-5, further including outputting an alert to a mobile device.

Example 7. The method of any of examples 1-6, further including activating a ventilation system.

Example 8. The method of any of examples 1-7, further including notifying a central safety monitoring system.

Example 9. The method of any of examples 1-8, further including detecting, by the first CO sensor, a second level of CO less than the first level of CO; determining, based on the second level, that at least one appliance of the first subset of CO sources was a cause of the first level of CO; transmitting a second signal that causes each of the first subset of CO sources to be reactivated one-at-a-time in order to determine which appliance of the first subset of CO sources was the cause of the first level of CO; and transmitting a third signal that causes each of the first subset of CO sources except for the determined cause of the first level of CO to be reactivated.

Example 10. The method of example 9, further including outputting an indication of the determined cause of the first level of CO.

Example 11. A carbon-monoxide (CO) detection system includes a two or more carbon monoxide (CO) sensors; and a controller device including a memory configured to store a set of associations between the two or more CO sensors and two or more CO sources; and processing circuitry configured to receive an indication that a first CO sensor of the two or more CO sensors has detected a level of CO that is above a threshold level for a threshold amount of time; retrieve from the memory the set of associations; determine, based on the set of associations, a first subset of CO sources associated with the first CO sensor, wherein the first subset of CO sources comprises fewer than all of the two or more CO sources; and transmit a first signal that causes the first subset of CO sources to be disabled.

Example 12. The CO detection system of example 11, the processing circuitry of the controller device further configured to transmit a second signal that causes a ventilation system to be activated.

Example 13. The CO detection system of examples 11 or 12, wherein the first subset of CO sources includes a water heater.

Example 14. The CO detection system of example 11, the processing circuitry of the of the controller device further configured to cause the first subset of CO sources to be disabled by transmitting a second signal causing a gas valve to be closed.

Example 15. The CO detection system of example 14, wherein the gas valve comprises a main shutoff valve for a building.

Example 16. The CO detection system of example 14, wherein the gas valve comprises a shutoff valve in a gas line leading to an appliance.

Example 17. The CO detection system of any of examples 11-16, wherein deactivating the first subset of CO sources comprises deactivating at least one appliance associated with the first CO sensor.

Example 18. The CO detection system of example 17, wherein the at least one appliance is located in a same room as the first CO sensor.

Example 19. The CO detector system of any of examples 11-18, the processing circuitry of the controller device further configured to output a recommendation for a user to open a window to reduce the level of CO.

Example 20. A device including a computer-readable medium having executable instructions stored thereon, configured to be executable by processing circuitry for causing the processing circuitry to receive, from a carbon-monoxide (CO) sensor, an indication of a first detected level of CO that has been above a threshold level of CO for a threshold amount of time; determine, from a plurality of CO sources, a first subset of CO sources associated with the CO sensor, wherein the first subset of CO sources is less than all of the plurality of CO sources; and transmit a signal that causes the first subset of CO sources to be disabled.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a random access memory (RAM), read only memory (ROM), non-volatile RAM (NVRAM), electrically erasable programmable ROM (EEPROM), or flash memory. The computer-readable storage media may be referred to as non-transitory. A computing device may also contain a more portable removable memory type to enable easy data transfer or offline data analysis.

The techniques described in this disclosure, including those attributed to sensors 121 and controller device 118, and various constituent components, may be implemented, at least in part, in hardware, software, firmware or any combination thereof. For example, various aspects of the techniques may be implemented within one or more processors, including one or more microprocessors, digital signal processor (DSP), application specific integrated circuit (ASIC), field programmable gate array (FPGA), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A method comprising:
   maintaining, in a memory, a set of associations between two or more carbon monoxide (CO) sensors and two or more CO sources;
   receiving, by processing circuitry, data from a first CO sensor of the two or more CO sensors;
   determining, by the processing circuitry and based on the data received from the first CO sensor, that a first level of CO detected by the first CO sensor has exceeded a first threshold level of CO for a first threshold period of time;
   identifying, based on the set of associations, a first subset of CO sources associated with the first CO sensor, wherein the first subset of CO sources comprises at least one CO source of the two or more CO sources and fewer than all of the two or more CO sources;
   in response to determining that the first level of CO detected by the first CO sensor currently exceeds the first threshold level of CO and has exceeded the first threshold level of CO for the first threshold period of time, disabling the first subset of CO sources, wherein disabling the first subset of CO sources comprises transmitting a first signal that causes the first subset of CO sources to be disabled;
   in response to disabling the first subset of CO sources, detecting, by the first CO sensor, a second level of CO less than the first level of CO;
   determining, based on the second level, that at least one appliance of the first subset of CO sources was a cause of the first level of CO;
   transmitting a second signal that causes each of the first subset of CO sources to be reactivated one-at-a-time in order to determine which appliance of the first subset of CO sources was the cause of the first level of CO; and
   transmitting a third signal that causes each of the first subset of CO sources except for the determined cause of the first level of CO to be reactivated.

2. The method of claim 1, further comprising: determining that a second level of CO detected by a second CO sensor of the two or more CO sensors is:
   below the first threshold level of CO, or
   has been above the first threshold level of CO for less than the first threshold period of time, wherein the second level of CO is different than the first level of CO; and
   wherein transmitting the first signal causes the first subset of CO sources associated with the first CO sensor to be disabled while leaving a second subset of CO sources associated with the second CO sensor unaffected, wherein the second subset of CO sources comprises fewer than all of the two or more CO sources.

3. The method of claim 1, wherein the first subset of CO sources associated with the first CO sensor are located in a same room as the first CO sensor.

4. The method of claim 1, wherein the first subset of CO sources includes one or more appliances.

5. The method of claim 1, further comprising:
   determining that the first subset of CO sources associated with the first CO sensor includes a primary heat source; and
   activating a backup heat source.

6. The method of claim 1, further comprising outputting an alert to one or more of: a mobile device and a central safety-monitoring station.

7. The method of claim 1, further comprising activating a ventilation system.

8. The method of claim 1, further comprising outputting an indication of the determined cause of the first level of CO.

9. A carbon-monoxide (CO) detection system comprising:
   two or more carbon monoxide (CO) sensors; and
   a controller device comprising:
      a memory configured to store a set of associations between the two or more CO sensors and two or more CO sources; and
      processing circuitry configured to:
         receive an indication that a first CO sensor of the two or more CO sensors has detected a level of CO that is above a threshold level for a threshold amount of time;
         retrieve from the memory the set of associations;
         determine, based on the set of associations retrieved from the memory, that a first subset of CO sources is associated with the first CO sensor, wherein the first subset of CO sources comprises at least one CO source of the two or more CO sources and fewer than all of the two or more CO sources;

in response to determining that the first level of CO detected by the first CO sensor currently exceeds the first threshold level of CO and has exceeded the first threshold level of CO for the first threshold period of time, disable the first subset of CO sources, wherein to disable the first subset of CO sources comprises transmitting a signal that causes the first subset of CO sources to be disabled;

in response to disabling the first subset of CO sources, detect, by the first CO sensor, a second level of CO less than the first level of CO;

determine, based on the second level, that at least one appliance of the first subset of CO sources was a cause of the first level of CO;

transmitting a second signal that causes each of the first subset of CO sources to be reactivated one-at-a-time in order to determine which appliance of the first subset of CO sources was the cause of the first level of CO; and transmitting a third signal that causes each of the first subset of CO sources except for the determined cause of the first level of CO to be reactivated.

10. The CO detection system of claim 9, the processing circuitry of the controller device is further configured to transmit a second signal that causes a ventilation system to be activated.

11. The CO detection system of claim 9, wherein the first subset of CO sources comprises a water heater.

12. The CO detector system of claim 9, wherein to disable the first subset of CO sources further comprises transmitting a second signal causing a gas valve to be closed.

13. The CO detection system of claim 12, wherein the gas valve comprises a main shutoff valve for a building.

14. The CO detection system of claim 12, wherein the gas valve comprises a shutoff valve in a gas line leading to an appliance.

15. The CO detection system of claim 9, wherein to disable the first subset of CO sources comprises deactivating at least one appliance associated in the memory with the first CO sensor.

16. The CO detection system of claim 15, wherein the at least one appliance is located in a same room as the first CO sensor.

17. The CO detection system of claim 9, the processing circuitry of the controller device further configured to output a recommendation for a user to open a window to reduce the level of CO.

18. A device comprising a non-transitory computer-readable storage medium having executable instructions stored thereon, configured to be executable by processing circuitry for causing the processing circuitry to:

receive, from a carbon-monoxide (CO) sensor, an indication of a first detected level of CO that has been above a threshold level of CO for a threshold amount of time;

determine, from a plurality of CO sources, a first subset of CO sources associated with the CO sensor, wherein the first subset of CO sources comprises at least one CO source of the plurality of CO sources and fewer than all of the plurality of CO sources;

in response to determining that the first level of CO detected by the first CO sensor currently exceeds the first threshold level of CO and has exceeded the first threshold level of CO for the first threshold period of time, disable the first subset of CO sources, wherein to disable the first subset of CO sources, the instructions cause the processing circuitry to transmit a signal that causes the first subset of CO sources to be disabled;

in response to disabling the first subset of CO sources, detecting, by the first CO sensor, a second level of CO less than the first level of CO;

determining, based on the second level, that at least one appliance of the first subset of CO sources was a cause of the first level of CO;

transmitting a second signal that causes each of the first subset of CO sources to be reactivated one-at-a-time in order to determine which appliance of the first subset of CO sources was the cause of the first level of CO; and transmitting a third signal that causes each of the first subset of CO sources except for the determined cause of the first level of CO to be reactivated.

* * * * *